United States Patent [19]

Rebenstorf

[11] 4,054,327
[45] Oct. 18, 1977

[54] AIR BRAKE SYSTEM WITH LINE PRESSURE LOSS PROTECTION

[75] Inventor: Vernon A. Rebenstorf, Aurora, Ill.

[73] Assignee: Caterpillar Tractor Co., Peoria, Ill.

[21] Appl. No.: 724,432

[22] Filed: Sept. 20, 1976

[51] Int. Cl.² ............................................. B60T 17/18
[52] U.S. Cl. ................................. 303/84 R; 137/118
[58] Field of Search ............................. 137/101, 118; 188/151 A; 303/57, 59, 64, 66, 84 A, 84 R

[56] References Cited

U.S. PATENT DOCUMENTS

| | | | |
|---|---|---|---|
| 2,110,342 | 3/1938 | Salvo | 303/84 A |
| 2,534,871 | 12/1950 | Lichtman | 303/84 A X |
| 2,861,845 | 11/1958 | Keehn | 303/84 A UX |
| 2,874,002 | 2/1959 | Cambeis | 303/2 |
| 3,018,786 | 1/1962 | Stratton | 303/84 A X |
| 3,278,242 | 10/1966 | Nakamura | 303/13 |
| 3,583,436 | 6/1971 | Chouings | 303/84 A |

*Primary Examiner*—Duane A. Reger

*Attorney, Agent, or Firm*—Phillips, Moore, Weissenberger, Lempio & Majestic

[57] ABSTRACT

An air brake system for a vehicle with a plurality of air-operated brakes has means for retaining braking capacity in the event of line rupture or severe leakage at various points in the system. Brake control means, preferably of the form with two separately actuatable control valves each independently capable of actuating the brakes, has two check valve-protected air-receiving ports each coupled to a separate one of two reservoirs. The reservoirs are charged through separate air supply passages from a compressor and means are provided for blocking air flow from the compressor to either supply passage in response to a pressure loss in either passage from line rupture or severe leakage. Such means may be a pilot-controlled shuttle valve situated at the compressor outlet or a pair of air fuses of the kind which close when air flow exceeds a predetermined value. In a preferred form, both the shuttle valve and air fuses are present as each enhances the actuation of the other.

10 Claims, 2 Drawing Figures

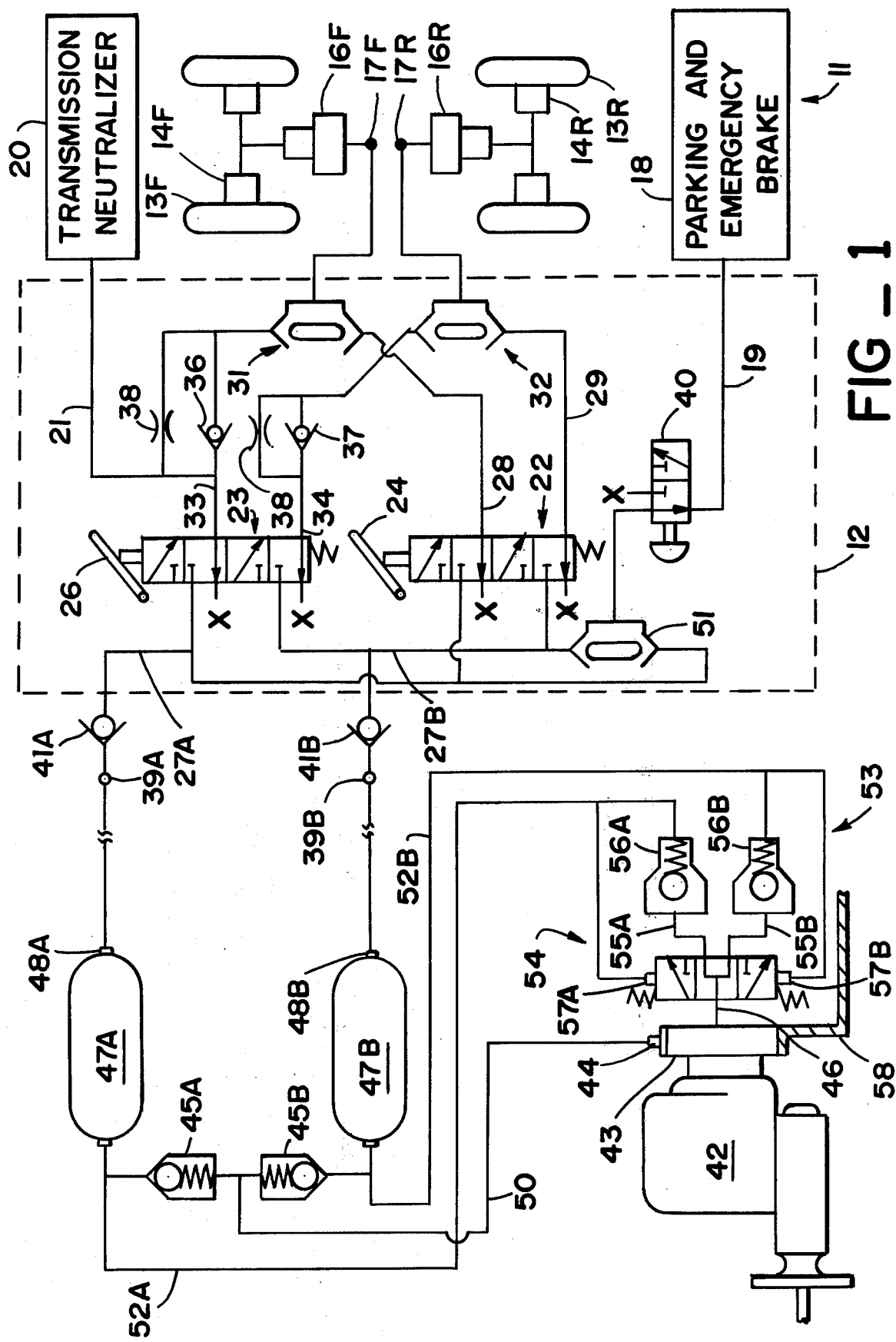
FIG_1

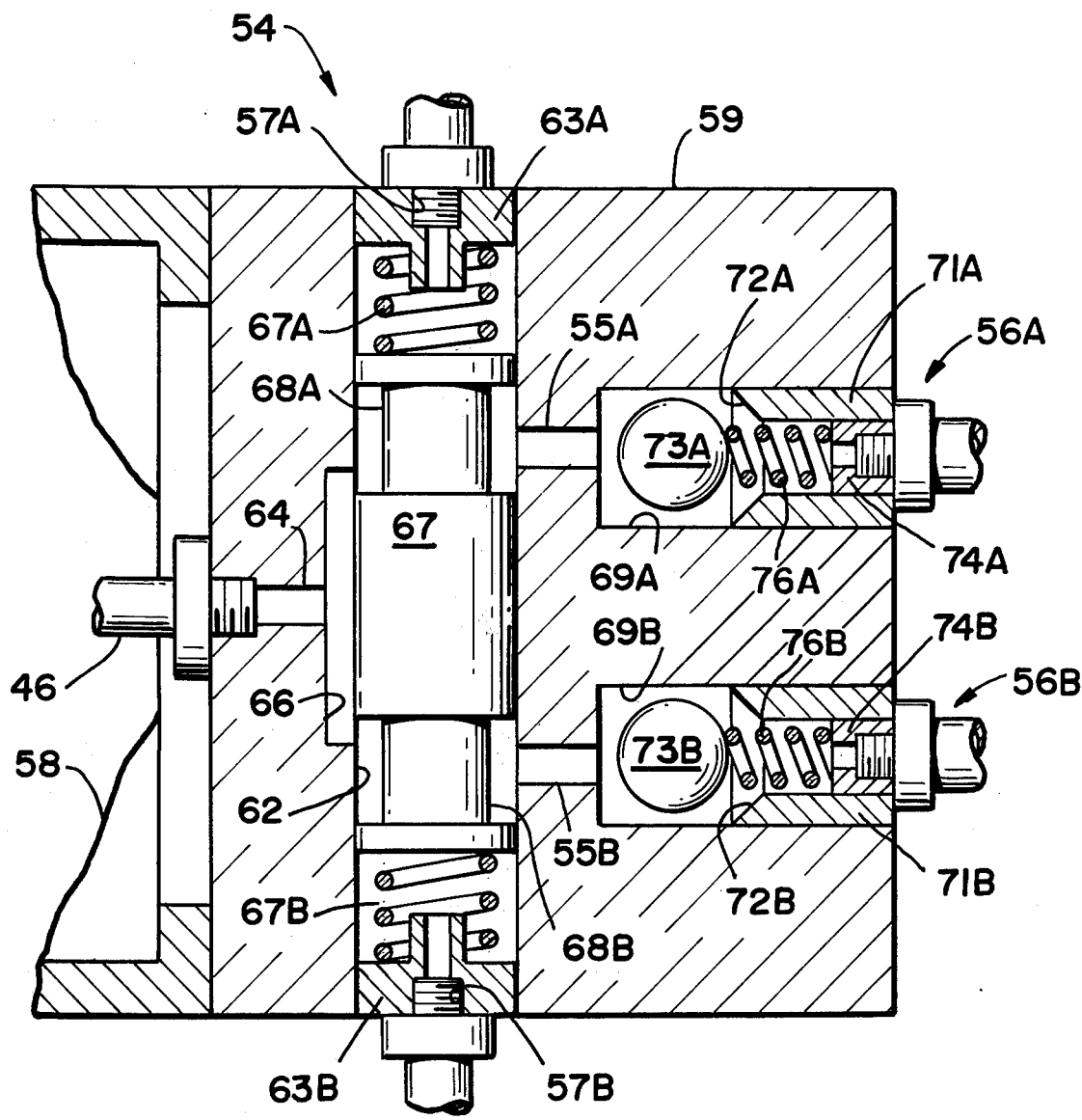
FIG _ 2

AIR BRAKE SYSTEM WITH LINE PRESSURE LOSS PROTECTION

BACKGROUND OF THE INVENTION

This invention relates to air brake systems for vehicles and more particularly to systems of this kind employing duplicated components to maintain braking capacity in the event of a line rupture or other severe leakage at some point in the system.

In furtherance of operational safety it has been a common practice to design air brake systems with at least some degree of redundancy or duplication of components so that in event of failure of one part of the system, from line rupture, severe leakage, jamming of mechanical parts or the like, at least some braking capacity may still be available through other portions of the system. More than one brake is usually provided together with more than one operator-actuated control valve or the like and means may be present to seal off portions of one side of the system from the other in the event of malfunction of the one side.

Copending application Ser. No. 695,875, filed June 14, 1976, by Henry E. Beck et al. and assigned to the assignee of this application, discloses one air brake system of this general kind in which the advantages of duplicated components are carried completely back through dual air reservoirs to the outlet of the compressor itself.

In most systems of the kind discussed above, one or more check valves provide for retaining a charge of compressed air in one or more reservoirs in the event of line rupture or severe leakage between the compressor and the reservoirs. This provides for a temporary retention of braking capacity sufficient for at least one and usually several braking cycles following the malfunction. However, following a line rupture of this kind, the compressor may no longer be able to recharge the reservoir or reservoirs as the pressurized air flow delivered by the compressor may then be partially or wholly lost through the rupture or leakage point. As a result, the pressure in the reservoir or reservoirs will eventually drop to the point that repeated braking operations cannot be continued. Warning systems are provided to alert the operator to the dropping of pressure in the reservoir or reservoirs so that corrective action may be taken while sufficient pressure remains in the reservoir to accomplish one or more braking operations. In most of these prior systems, still further fail safety is provided for in that if the operator does not take timely corrective action, the emergency brake will eventually go on automatically, as it is spring-biased to engage position and is only held disengaged by air pressure from the reservoirs.

It would be preferable if a line rupture between the compressor and one of the reservoirs did not interfere with continued charging of at least one other reservoir so that braking capacity would be retained indefinitely. This is particularly true where long flow passages are present between the compressor and the reservoirs as the possibility of rupture or serious leakage may be greater under those circumstances.

SUMMARY OF THE INVENTION

This invention is an air brake system having a dual air delivery and air storage system between the source of compressed air and the brakes and brake control means wherein one branch of the air delivery and storage system continues to function indefinitely in the event of a rupture or severe leakage in the other.

Means are provided to seal off either branch of the air delivery flow path and storage system if a severe pressure drop occurs in that branch as a result of line rupture or other causes. Consequently the pressurized air flow being delivered by the compressor or the like is not released to the atmosphere but is instead wholly diverted to the other branch of the air delivery and storage system to maintain the reservoir associated with that other branch in a charged condition irrespective of continued use of the brakes. Such means may be a specialized form of shuttle valve pilot-controlled by the pressures in the two branches of the air delivery system or such means may be air fuses of the form which are normally open but close in response to an air flow above a predetermined normal magnitude such as occurs in the event of a line rupture. In a preferred form both the pilot-operated shuttle valve and the air fuses are employed as each enhances the action of the other.

Accordingly, it is an object of this invention to maintain braking capacity in an air brake system following a line rupture or other severe leakage between the compressed air source and the brake control means.

The invention, together with further objects and advantages thereof, will be understood by reference to the following description of a preferred embodiment taken in conjunction with the accompanying drawings.

BRIEF DESCRITPION OF THE DRAWINGS

In the accompanying drawings:

FIG. 1 is a pneumatic circuit diagram of a vehicle air brake system embodying the invention, and FIG. 2 is a sectional view showing a suitable detailed construction for a pilot-operated shuttle valve and air fuse assembly which is depicted schematically in FIG. 1.

DESCRIPTION OF A PREFERRED EMBODIMENT

Referring initially to FIG. 1 of the drawings, certain components of an air brake system for a vehicle 11 including a suitable brake control means 12 are depicted in diagrammatic form. In this particular example the vehicle 11 is of the form having front and rear pairs of wheels 13F and 13R respectively with front and rear fluid pressure-actuated brakes 14F and 14R. The brakes 14F at the front wheels are connected to a front master cylinder 16F of the known form having a pressurized air line 17F which connects with brake control means 12 to provide for application and release of the brakes. Similarly, a rear master cylinder 16R operated through a control line 17R connects with the brakes 14R of the rear wheels. The vehicle may be further provided with a parking and emergency brake 18 having a control line 19 for receiving compressed air from the brake control means 12. The parking and emergency brake 18 is preferably of the known form which is spring-biased to an actuated condition and which is released by the application of air pressure to control line 19. This known form of parking and emergency brake adds fail-safety as it actuates automatically in the event of total failure of air pressure within the system.

Certain vehicles to which the invention may be applied may have several modes of service braking including one mode at which a transmission neutralizer 20 is activated while the brakes 14 are applied and another mode in which the transmission neutralizer is not actuated while the brakes are applied. In a wheel loader vehicle for example, as used in earth-moving operations or in the handling of other bulk materials, it may be desirable to neutralize the vehicle transmission if the vehicle is to be brought to a full stop or is to undergo a drastic speed reduction since neutralization of the transmission keeps the vehicle engine from working against the brakes. Under other circumstances, for example where it is desired only to retard vehicle motion to some degree, it may not be desirable to establish a neutral condition in the transmission during braking. To enable either mode of operation as will hereinafter be described in more detail, the vehicle 11 has a transmission neutralizer 20 of the known form which is actuated by compressed air received through a control line 21 connecting with the brake control means 12.

The above-described vehicle components, including brakes 14, master cylinders 16, parking and emergency brake 18 and transmission neutralizer 20 may all have detailed construction known to the art and have therefore been depicted only diagrammatically in the drawings and are only briefly described above in order to facilitate an understanding of the coaction of the present invention with these components of the vehicle. Also, it should be recognized that the vehicle 11 having the above-described particular forms of brakes, master cylinders, transmission neutralizer and the like, is but one example of a type of vehicle to which the invention may be applied.

Similarly, the invention may utilize any of a variety of brake control means 12, salient elements of one particular form of control means being depicted in FIG. 1. However, the advantages of the present invention are most fully realized if the brake control means 12 is of the form having dual components wherein if one side of the system should malfunction the other side remains capable of providing at least some braking function.

In the example of a brake control means 12 depicted in FIG. 1, there are two separate control valves 22 and 23 either of which may be actuated by the operator through means such as foot pedals 24 and 26 respectively. Control valve 22 is connected between two separate compressed air intake passages 27A and 27B and a pair of outlet lines 28 and 29. Valve 22 is spring-biased to an unoperated position at which both outlets 28 and 29 are vented to atmosphere. Outlet line 28 connects with front master cylinder control line 17F through one inlet of a shuttle valve 31 while outlet line 29 connects with the control line 17R of the rear master cylinder through one inlet of another shuttle valve 32. Upon depression of pedal 24 by the operator, valve 22 shifts to an alternate position at which outlet lines 28 and 29 are communicated with compressed air intake passages 27A and 27B respectively thereby applying both the front brakes 14F and rear brakes 14R. It may be observed that application of the vehicle brakes by means of control valve 22 in this manner does not actuate the transmission neutralizer 20. When that mode of operation is desired, the operator depresses pedal 26 of the other control valve 23.

The other control valve 23 may be essentially similar to control valve 22 and thus has a pair of outlet lines 33 and 34 and is spring-biased towards a position at which both such outlet lines are vented to atmosphere. Upon shifting of the control valve 23 to the alternate position by depression of pedal 26, outlet lines 33 and 34 are communicated with compressed air intake passages 27A and 27B respectively. Outlet line 33 is communicated with the other inlet of shuttle valve 31 through a check valve 36 while outlet line 34 is communicated with the other inlet of shuttle valve 32 through another check valve 37. Thus operation of control valve 23 by depression of pedal 26 also results in application of the front and rear brakes 14F and 14R. At least one of the outlet lines, such as outlet line 33 in this example, is also communicated with control line 21 of transmission neutralizer 20 so that as the brakes are actuated by depression of foot pedal 26 the vehicle transmission is temporarily shifted into a neutral condition thereby providing for the alternate mode of service braking described above.

Check valves 36 and 37 are bypassed by flow restrictions 38 to enable release of the brakes when the operator releases pedal 26. The practical effect of the check valves 36 and 37 and associated flow restrictions 38 is to slow the release of the brakes slightly relative to the release of pressure from transmission neutralizer control line 21. This provides time for the transmission to re-engage prior to full release of the brakes thereby reducing drive line shocks in the vehicle.

To enable the operator to apply and release the parking and emergency brake 18, a two-position manually operated valve 40 is connected between both air intake passages 27A and 27B through a shuttle valve 51, and control line 19. Valve 40 has a brake-on position at which control line 19 is vented to atmosphere and a brake-off position at which the control line is pressurized.

Brake control means 12 is preferably provided with two separate compressed air-receiving ports 39A and 39B communicated with passages 27A and 27B respectively. Each port 39A and 39B is protected by an associated one of a pair of check valves 41A and 41B respectively. The check valves 41A and 41B act to seal off the control means 12 from compressed air-receiving port 39A or 39B if there is a pressure drop at either inlet port, resulting from a line rupture or other severe leakage in the components which supply compressed air to that particular port. This enables the brake control means 12 to continue to operate under that condition from air supplied to the other of the receiving ports.

Compressed air for operating the brake system is produced by a compressor 42, driven by the vehicle engine or other suitable means, and which is preferably of the known form having a governor 43 controlled by air pressure signals received at a control port 44. In governors 43 of this kind pressurization of the control port 44 diverts the flow of compressed air from the compressor outlet flow path 46 to a vent until such time as the control port 44 is depressuirzed.

Compressed air for operating the brake system is stored in two reservoirs 47A and 47B which have outlet ports 48A and 48B. Reservoir outlet 48A is communicated with air-receiving port 39A of the brake control means and the outlet port 48B of the other reservoir is separately communicated with the other air-receiving port 39B of the brake control means.

To provide a control signal to the compressor governor 44, each reservoir 47A and 47B is communicated with governor control port 44 through an associated one of a pair of check valves 45A and 45B and a control signal line 50, the chekc valves being spring-biased to remain closed until pressure in the associated reservoir reaches a predetermined maximum value.

Reservoirs 47A and 47B are charged with compressed air from compressor 42 through separate air supply passage means such as conduits 52A and 52B respectively. If the conduits 52A and 52B simply converged at the air outlet flow path 46 of the compressor, then if a rupture occurred in one such line the compressor would be unable to adequately maintain a compressed air charge in the other side of the system. To enable continued operation of one side of the air delivery and storage system in the event of such a malfunction in the other side, air delivery control means 53 are provided for closing the flow path from the compressor to either side in response to a predetermined pressure drop within that side such as occurs in the event of line rupture or severe leakage.

In this example the air delivery control means 53 includes a pilot-operated shuttle valve 54 having an air inlet which is an extension of the compressor air outlet flow path 46. Shuttle valve 54 has a first outlet 55A communicated with conduit 52A through an air fuse 56A and also has a second outlet 55B which connects with conduit 52B through still another air fuse 56B. Air fuses 56A and 56B are of the type which provide an open flow passage until such time as the flow velocity reaches a predetermined magnitude at which time the air fuses close. Thus the air fuses 56A and 56B act to close either outlet of valve 54 if a line rupture or the like occurs downstream from that outlet.

Pilot-operated shuttle valve 54 is spring-biased to a center position at which compressor air outlet 46 is communicated with both shuttle valve outlets 55A and 55B so that at this normal centered position of the shuttle valve 54, compressed air is delivered to both air supply conduits 52A and 52B to charge both reservoirs 47A and 47B.

Shuttle valve 54 has an air pressure pilot signal port 57A at one end communicated with conduit 52A and has another pilot signal port 57B at the other end communicated with conduit 52B. With the valve 54 in the above-described normal or centered position, pressure is present in both of conduits 52A and 52B. As this pressure is fed back to both pilot signal ports 57 of the shuttle valve, the opposing pilot pressures cancel out and the valve remains at the above-described centered position. If a break, line rupture or other severe leakage should occur at one side of the system between the shuttle valve 54 and the brake control means 12 then the resultant loss of pressure in the associated one of the conduits 52 unbalances the opposing pilot pressures at the shuttle valve 54 causing the valve to shift to seal off that side of the air delivery and storage system while enabling the compressor to continue to supply air to the other side of the system. If a rupture of conduit 52A should occur for example, the pilot pressure at port 57A of valve 54 drops abruptly. Since the pilot pressure at the opposite port 57B of the valve is no longer opposed, the valve shifts to close valve outlet 54A while continuing to supply compressed air to the other valve outlet 54B.

Such a loss of pressure in one side of the system also causes the associated one of the air fuses 56 to close as a result of the abnormal increase of air flow velocity through the fuse. This also acts to seal off the malfunctioning side of the system from the compressor. Thus it may be seen that the means 53 may, if desired, include only the pilot-operated shuttle valve 54 without utilizing the air fuses 56. Conversely the air fuses 56 may be utilized without the shuttle valve 54. However, in a preferred form, both the shuttle valve and the air fuses are used not only to provide the added safety that arises from having two different means each capable of accomplishing the desired function but also because each tends to enhance the operation of the other. For example, the presence of the air fuses 56A and 56B promotes faster and more abrupt operation of the piloted shuttle valve 54. For example, if severe leakage occurs in conduit 52B in a system where the air fuse 56B is not present, then the resultant pressure drop in conduit 52B may be relatively gradual and the shifting of shuttle valve 54 to seal off conduit 52B may proceed relatively gradually. With the air fuse 56B present, the pressure drop in line 52B and the resultant shifting of shuttle valve 54 will occur abruptly at the point where the air fuse 52B closes. Similarly, the sytem depicted in FIG. 1 provides a more complete sealing off of the malfunctioning side of the system than might be present in one which employed the air fuses 56A and 56B only.

In order to protect against line rupture, leakage and the like in as much of the system as possible, piloted shuttle valve 54 and air fuses 56A and 56B are preferably located close to the compressor 42 and remote from the reservoirs 7. The shuttle valve 54 and air fuses 56 may, in a preferred form, be mounted within a housing 58, which is part of the compressor assembly, thereby reducing the number of separate flow conduits and fittings in the system each of which is otherwise a potential source of rupture or leakage.

FIG. 2 illustrates one suitable detailed mechanical construction for the pilot-operated shuttle valve 54 and air fuses 56A and 56B. In the example depicted each of these compoenets is contained within a single body 59 which, as described above, may be secured to an adjacent portion 58 of the compressor.

To constitute the piloted shuttle valve 54 a bore 62 in body 59 may have opposite end closures 63A and 63B, the previously described pilot signal ports 57A and 57B being threaded passages extending through the end closures 63A and 63B respectively to receive the pilot signal line fittings. An air inlet passage 64 communicates the air outlet flow passage 46 of the compressor with a longitudinal slot 66 in the wall of the central portion of bore 62. The previously described outlets 55A and 55B of the shuttle valve 54 may be passages in body 59 which communicate with bore 62 in the region of the two opposite ends of slot 66.

A valve member or spool 67 is disposed in bore 62 for axial movement and is urged towards a centered position in the bore by a pair of compression springs 67A and 67B which bear against the opposite ends of the spool and against the end closures 63A and 63B respectively. Spool 67 has a groove 68A near one end located to communicate slot 66 with outlet 55A when the spool is at the above-described centered position. A second similar groove 68B near the opposite end of the spool is located to communicate the other end of slot 66 with the other outlet 54B when the spool is at the centered position.

As previously described, pilot pressure is normally present in those portions of bore 62 adjacent both ends of spool 67 and such pressures balance each other out so that the springs 67 are able to maintain the spool in the above-described centered position. If pilot pressure is lost at one end of the spool 67 then the pilot air pressure at the other end is able to shift the spool to block communication with the one of the outlets 55A and 55B which is closest to the end of the spool at which pilot pressure has been lost. Thus if the pilot pressure signal supplied to port 57A is lost due to line breakage or some other cause, spool 67 shifts to block outlet line 55A from air inlet 64 while maintaining the other outlet line 55B in communication with the air inlet. Similarly, if pilot pressure should be lost at the other pilot signal port 57B the spool shifts in an opposite direction to block outlet 55B while maintaining outlet 55A in communication with the air inlet 64.

Considering now a suitable detailed construction for the air fuses 56A and 56B, an additional pair of bores 69A and 69B may be provided in body 59 which communicate at one end with shuttle valve outlet passages 55A and 55B respectively. One of a pair of sleeves 71A and 71B may be disposed coaxially within each bore 69A and 69B respectively with each sleeve having an annular conical inner end surface 72A and 72B respectively forming a valve seat for an associated one of a pair of balls 73A and 73B which are situated within the bores 69A and 69B respectively. Sleeves 71A and 71B are closed at the other ends by plugs 74A and 74B respectively which have a threaded passage to receive a fitting so that the lines 52A and 52B of FIG. 1 may be connected to the outlets of the air fuses. Referring again to FIG. 2, a compression spring 76A is disposed within sleeve 71A to act between plug 74A and ball 73A to bias the ball away from valve seat 72A. Thus there is normally an open flow passage through the air fuse 56A from shuttle valve outlet 55A but if the air flow through the fuse reaches a predetermined high velocity the ball 73A compresses spring 76A and closes the flow path by seating against valve seat 72A. Similarly, a compression spring 76B extends within sleeve 74B between the ball 73B and plug 74B to enable the other air fuse 56B to function in a similar manner.

While the invention has been described with respect to a specific example it will be apparent that many modifications are possible and it is not intended to limit the invention except as defined in the following claims.

What is claimed is:

1. In an air brake system for a vehicle which has air-controlled brakes and a compressed air source, the combination comprising:
    brake control means for receiving said compressed air and for selectively applying said compressed air to said brakes and for selectively releasing said compressed air from said brakes,
    first and second compressed air reservoirs each having an air outlet port communicated with said brake control means,
    first air supply passage means for transmitting compressed air from said source to said first reservoir,
    second air supply passage means for transmitting compressed air from said source to said second reservoir, and
    air delivery control means, connected between said compressed air source and first and second air supply passage means, for closing the flow path from said source to either of said air supply passage means in response to air leakage therein while continuing to provide an open flow path from said source to the other of said air supply passage means in order to enable indefinitely continued operation of said air brake system.

2. In an air brake system for a vehicle which has air-controlled brakes and a compressed air source, the combination comprising:
    brake control means for receiving said compressed air and for selectively applying said compressed air to said brakes and for selectively releasing said compressed air from said brakes,
    first and second compressed air reservoirs each having an air outlet port communicated with said brake control means,
    first air supply passage means for transmitting compressed air from said source to said first reservoir,
    second air supply passage means for transmitting compressed air from said source to said second reservoir, and
    air delivery control means, connected between said compressed air source and said first and second air supply passage means, for closing the flow path from said source to either of said air supply passage means in response to air leakage therein, wherein said air delivery control means includes a shuttle valve having an air inlet communicated with said compressed air source and having first and second air outlets and having a movable valve member which is shiftable from a first position at which said inlet is communicated with both of said outlets to a second position at which said inlet is communicated only with said first outlet and which is shiftable to a third position at which said inlet is communicated only with said second outlet, said shuttle valve having means for biasing said valve member toward said first position thereof, and further includes pilot means for shifting said valve member of said shuttle valve to said second position thereof in response to a pressure drop in said second air supply passage means and for shifting said valve member to said third position thereof in response to a pressure drop in said first air supply passage means.

3. The combination defined in claim 2 further comprising a first air fuse connected between said first outlet of said shuttle valve and said first air supply passage means and a second air fuse connected between said second outlet of said shuttle valve and said second air supply passage means.

4. The combination defined in claim 3 wherein said shuttle valve and said air fuses are disposed at the outlet of said compressed air source of said vehicle.

5. The combination defined in claim 2 wherein said shuttle valve comprises a body having a bore therein which is closed at each end, said inlet of said shuttle valve being communicated with a central portion of said bore, said first outlet being communicated with a region of said bore between said central portion and one end thereof and said second outlet being communicated with a region of said bore between said central portion thereof and the other end thereof, a valve spool disposed for axial movement within said bore and having a pair of spaced-apart grooves one of which communicates with inlet with said first outlet and the other of which communicates said inlet with said second outlet when said spool is at a centered position in said bore, spring means biasing said valve spool toward said centered position in said bore, and wherein said pilot means comprises means communicating said first air supply passage means with said one end of said valve body bore and communicating said second air supply passage means with said other end of said valve bore.

6. The combination defined in claim 2 wherein said compressed air source is an air compressor having a compressed air outlet flow path and wherein said shuttle valve is secured adjacent said compressor with said inlet of said shuttle valve being communicated directly with said compressor outlet flow path.

7. In an air brake system for a vehicle which has air-controlled brakes and a compressed air source, wherein said compressed air source is a compressor of the form having an air pressure-controlled governor, the combination comprising:

brake control means for receiving said compressed air and for selectively applying said compressed air to said brakes and for selectively releasing said compressed air from said brakes, first and second compressed air reservoirs each having an air outlet port communicated with said brake control means, first air supply passage means for transmitting compressed air from said source to said first reservoir, second air supply passage means for transmitting compressed air from said source to said second reservoir, and air delivery control means, connected between said compressed air source and said first and second air supply passage means, for closing the flow path from said source to either of said air supply passage means in response to air leakage therein, a branched flow signal conduit connected between said governor and each of said reservoirs, and a pair of check valves each being disposed in a separate branch of said conduit and having means for blocking air flow from said reservoirs to said governor except when the pressure in at least one of said reservoirs exceeds a predetermined value.

8. In an air brake system for a vehicle which has air-controlled brakes and a compressed air source, the combination comprising:

brake control means for receiving said compressed air and for selectively applying said compressed air to said brakes and for selectively releasing said compressed air from said brakes, first and second compressed air reservoirs each having an air outlet port communicated with said brake control means, first air supply passage means for transmitting compressed air from said source to said first reservoir, second air supply passage means for transmitting compressed air from said source to said second reservoir, and air delivery control means, connected between said compressed air source and said first and second air supply passage means, for closing the flow path from said source to either of said air supply passage means in response to air leakage therein, wherein said air delivery control means comprises a pair of air fuses each being disposed in a separate one of the flow paths between said source and said brake control means, each of said air fuses having means for closing said flow path when air flow therethrough reaches a predetermined velocity.

9. In an air brake system for a vehicle which has air-controlled brakes and a compressed air source, the combination comprising:

brake control means for receiving said compressed air and for selectively applying said compressed air to said brakes and for selectively releasing said compressed air from said brakes, wherein said brake control means has at least two separate compressed air-receiving ports each communicating with a one-way flow valve, first and second compressed air reservoirs each having an air outlet port communicated with said brake control means, a pair of separate air conduits each communicating said outlet port of a separate one of said reservoirs with a separate one of said air-receiving ports, first air supply passage means for transmitting compressed air from said source to said first reservoir, second air supply passage means for transmitting compressed air from said source to said second reservoir, and air delivery control means, connected between said compressed air source and said first and second air supply passage means, for closing the flow path from said source to either of said air supply passage means in response to air leakage therein.

10. The combination defined in claim 9 wherein said vehicle has first and second separate brakes and wherein said brake control means has a pair of separately actuatable brake control valves each capable of energizing both of said brakes.

* * * * *

UNITED STATES PATENT OFFICE
CERTIFICATE OF CORRECTION

Patent No. 4,054,327          Dated   October 18, 1977

Inventor(s)  Vernon A. Rebenstorf

It is certified that error appears in the above-identified patent and that said Letters Patent are hereby corrected as shown below:

Abstract, last line - "actuation" should read --action--.

Column 2, line 29  - "DESCRITPION" should read --DESCRIPTION--.

Column 8, line 52  - "with" (first occurrence) should read --said--.

Signed and Sealed this

Thirtieth Day of May 1978

[SEAL]

Attest:

RUTH C. MASON
Attesting Officer

LUTRELLE F. PARKER
Acting Commissioner of Patents and Trademarks